United States Patent [19]
Drott

[11] Patent Number: 6,079,794
[45] Date of Patent: Jun. 27, 2000

[54] BRAKE-ACTUATING DEVICE

[75] Inventor: Peter Drott, Frankfurt am Main, Germany

[73] Assignee: ITT Manufacturing Enterprises, Inc., Wilmington, Del.

[21] Appl. No.: 08/981,186

[22] PCT Filed: Jun. 26, 1996

[86] PCT No.: PCT/EP96/02778

§ 371 Date: Feb. 17, 1998

§ 102(e) Date: Feb. 17, 1998

[87] PCT Pub. No.: WO97/01472

PCT Pub. Date: Jan. 16, 1997

[30] Foreign Application Priority Data

Jun. 29, 1995 [DE] Germany .......................... 195 23 590

[51] Int. Cl.[7] .............................. B60T 15/14; F16H 35/00
[52] U.S. Cl. .................. 303/20; 188/1.11 E; 74/625; 74/388 R; 74/471 R
[58] Field of Search .................. 74/625, 388 R, 74/471 R; 303/20; 188/1.11 E, 2 D, 24.21

[56] References Cited

U.S. PATENT DOCUMENTS

| 3,455,418 | 7/1969 | Littmann | 188/162 |
|---|---|---|---|
| 5,067,366 | 11/1991 | Gandiglio | 74/625 |
| 5,178,237 | 1/1993 | Ursel et al. | 74/625 |
| 5,417,624 | 5/1995 | Weissbrich et al. | 188/2 D |
| 5,485,764 | 1/1996 | Sugimoto et al. | 74/625 |
| 5,555,773 | 9/1996 | Nanno et al. | 74/512 |

FOREIGN PATENT DOCUMENTS

| 0411328A1 | of 0000 | European Pat. Off. . |
|---|---|---|
| 2648460A1 | of 0000 | Germany . |
| 3238196A1 | of 0000 | Germany . |
| 3238196 A1 | 4/1984 | Germany . |

*Primary Examiner*—Robert J. Oberleitner
*Assistant Examiner*—Robert A. Siconolfi
*Attorney, Agent, or Firm*—Rader, Fishman & Grauer PLLC

[57] ABSTRACT

A brake actuating device for a parking brake of automotive vehicles includes a hand brake lever which acts upon two wheel brakes by way of two brake cables. To assist the manual operation, an electric motor is additionally provided which generates at least part of the actuating force.

4 Claims, 1 Drawing Sheet

BRAKE-ACTUATING DEVICE

BACKGROUND OF THE INVENTION

The present invention relates to a brake actuating device for a parking brake of automotive vehicles, including a hand brake lever which acts upon two wheel brakes by way of two brake cables.

In hand brake devices of this type, the actuation is frequently felt as uncomfortable because a high amount of actuating force must be generated manually by the driver for operation of the hand brake lever, especially in order to arrest the vehicle on a sloping road surface.

An object of the present invention is to provide a more comfortable brake actuating device for a parking brake which necessitates in particular a small amount of force for the operation of the hand brake lever.

SUMMARY OF THE INVENTION

The object of the present invention is achieved by the additional provision of an electric motor which generates at least part of the actuating force for the operation of the hand brake lever. Thus, with the actuating device of the present invention, the driver is required to produce only a small amount of actuating force or no actuating force at all. In the latter case, the brake actuating device would simply be operable by an electric switch.

The pivot bearing axis of the hand brake lever has a large-size toothed wheel which is engaged by a small pinion gear of the electric motor. The mentioned arrangement is a reduction gear used to multiply the relatively low force of the electric motor for operation of the parking brakes. A particularly compact arrangement is achieved by positioning the motor axis beside the hand brake lever and vertically relative to the pivot bearing axis. An arrangement of this type can easily be accommodated in the center console of a vehicle.

The boosting force of the electric motor is especially comfortably adjusted by the provision of a potentiometer which senses the position of the hand brake lever and controls the desired boosting force by means of the associated motor current.

According to a preferred aspect of the present invention, a mechanic locking engagement of the hand brake lever in the braking position is releasable by an electromechanic stroke magnet. An arrangement of this type permits full electric remote control of the parking brake. Additional possible applications of the parking brake actuation are achieved, for example, an automatically controlled release when the vehicle starts to drive uphill, or automatic locking of the brake when there is imminent danger of the vehicle rolling downhill.

According to another preferred aspect of the present invention, the hand brake lever is additionally rotatable about its longitudinal axis, with the result that one of the two operating cables is tensioned depending on the direction of rotation. Only one wheel brake is selectively operated in a subsequent operation of the hand brake lever. This way, a spinning drive wheel can be selectively braked to increase the driving force applied to the other drive wheel. In this case, the hand brake will function as a differential lock.

Further, wear of the friction linings in the wheel brakes can be determined from the actuating travel of the brake actuating device by measuring the motor current in relation to the angle of rotation about the pivot bearing axis. The motor current is generally proportional to the actuating force, and the angle of rotation is generally proportional to the actuating travel. The actuating travel until the full response of the brakes rises with increasing wear of the friction linings.

One embodiment of the present invention will be explained in detail hereinbelow, making reference to the accompanying drawing.

DETAILED DESCRIPTION OF THE DRAWINGS

Figure 1:
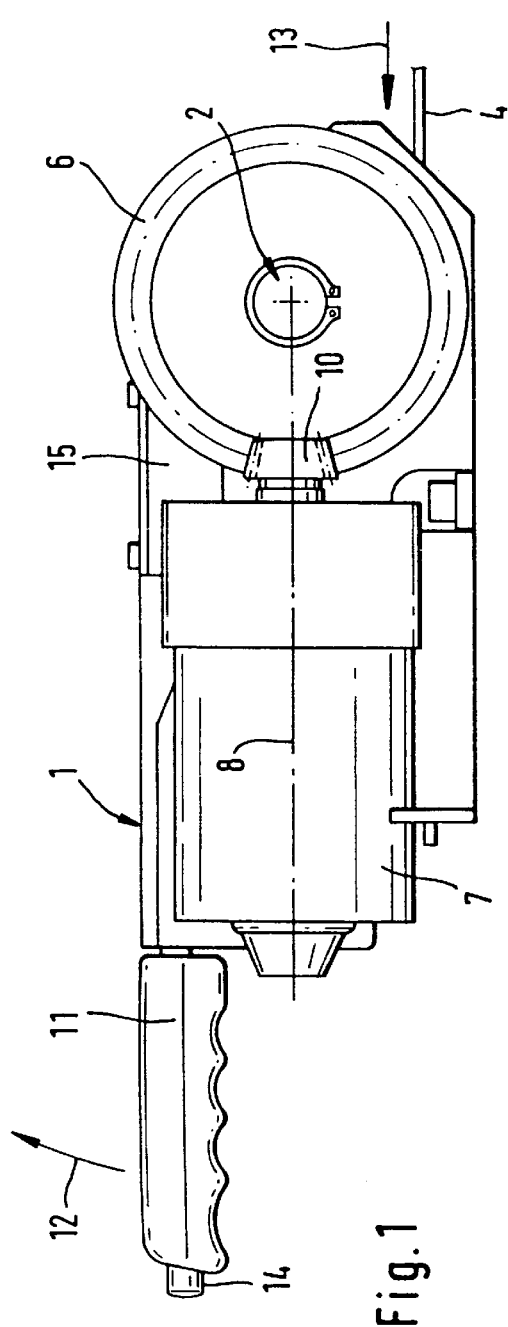
FIG. 1 is a side view of a brake actuating device of the present invention.
Figure 2:
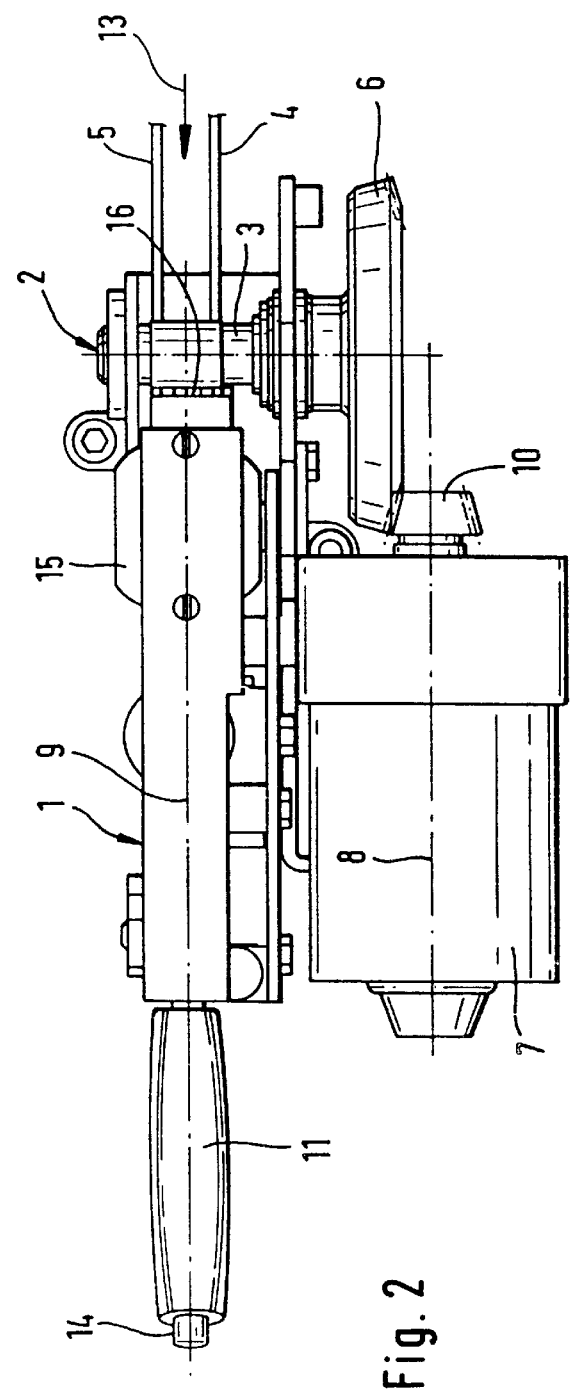
FIG. 2 is a top view of the same device.

The brake actuating device includes a hand brake lever 1 which is connected to a pivot bearing axis 2 and is thereby pivoted. The pivot bearing axis 2 includes a pin portion 3 to which the hand brake lever 1 and two brake cables 4, 5 are attached. The brake cables 4, 5 are partly wrapped around the pin portion 3. A large-size toothed wheel 6 is fastened to the pivot bearing axis 2 laterally beside the hand brake lever 1. An electric motor 7 is also fastened laterally beside the hand brake lever 1 so that the motor axis 8 extends substantially parallel to the longitudinal axis 9 of the hand brake lever 1 in the release position. The motor axis 8 is positioned vertically relative to the pivot bearing axis 2. A small-size pinion gear 10 of the electric motor 7 meshes with the toothed wheel 6.

The operation may be effected completely manually, without the assistance of the electric motor 7, by the driver taking a grip 11 of the hand brake lever 1 in the hand and pulling it in the actuating direction 12. The pivot bearing axis 2 will turn and wind up the two brake cables 4, 5 so that they move in the direction of trajectory motion 13. The brake cables 4, 5 extend to two wheel brakes which are operated by the brake cables 4, 5. A mechanic locking engagement (not shown) will subsequently retain the hand brake lever 1 in the braking position, even if the manual actuating force in the actuating direction 12 decreases. The driver can release the hand brake by pushing a release button 14 and, thereafter, by returning the hand brake lever 1 to the release position in opposition to the actuating direction 12.

During electrically assisted operation, the position of the hand brake lever 1 is sensed by a potentiometer (not shown), and an associated motor current is controlled by the electric motor 7 depending on the boosting force desired. The pinion gear 10 of the electric motor 7 turns and transmits the rotary movement to the large-size toothed wheel 6, with the motor force being multiplied. The toothed wheel 6, in turn, rotates the pivot bearing axis 2 and, thus, generates part of the actuating force for tensioning the brake cables 4, 5 in the direction of trajectory motion 13. The operation of the parking brake may also be controlled fully electrically by supplying the motor with current by way of an electric switch of alternative accommodation. The brake cables 4, 5 are tensioned in this case without the driver touching the hand brake lever 1. The hand brake lever 1 can be released electromechanically by remote control in that the mechanic locking engagement of the hand brake lever 1 is removed by way of a lifting magnet 15.

In addition, the hand brake lever 1 is rotatable about its longitudinal axis 9. Preferably, one of the brake cables 4, 5 which is wrapped around the hand brake lever 1 at the location 16 is pretensioned. Only that one of the two brake cables 4, 5 is selectively actuated during subsequent operation of the hand brake lever 1 in the actuating direction 12.

What is claimed is:

1. A brake actuating device for a parking brake of automobile vehicles, including a hand brake lever which acts upon two wheel brakes by way of two brake cables, wherein an electric motor which generates at least part of the actuating force is provided in addition for the operation of the hand brake lever, and the hand break lever having a pivot bearing axis with a large-size toothed wheel which is engaged by a small pinion gear of the electric motor, wherein the motor has a rotary axis that is generally perpendicular relative to the pivot bearing axis, and wherein the hand brake lever has a release position and a longitudinal axis which, in the release position of the hand brake is arranged generally in parallel beside the motor axis, and further wherein the position of the hand brake lever is sensed by a potentiometer which controls the associated motor current depending on a desired boosting force, wherein the hand brake lever has a braking position with a mechanical locking engagement which is releasable by an electromechanical stroke magnet.

2. The device as claimed in claim 1, wherein the hand brake lever has a longitudinal axis, about which the hand brake lever is rotatable, with the result that one of the two brake cables is tensioned depending on the direction of rotation so that only one wheel brake is selectively operated in a subsequent operation of the hand brake lever.

3. The device as claimed in any one of the preceding claims, wherein the wear of the friction linings in the wheel brakes can be determined from the actuating travel of the brake actuating device by measuring the motor current in relation to the angle of rotation about the pivot bearing axis.

4. A brake actuating device for a parking brake of automobile vehicles, including a hand brake lever which acts upon two wheel brakes by way of two brake cables, wherein an electric motor which generates at least part of the actuating force is provided in addition for the operation of the hand brake lever, and the hand break lever having a pivot bearing axis with a large-size toothed wheel which is engaged by a small pinion gear of the electric motor, wherein the motor has a rotary axis that is generally perpendicular relative to the pivot bearing axis, and wherein the hand brake lever has a release position and a longitudinal axis which, in the release position of the hand brake is arranged generally in parallel beside the motor axis, and further wherein the position of the hand brake lever is sensed by a potentiometer which controls the associated motor current depending on a desired boosting force, wherein the hand brake lever has a longitudinal axis, about which the hand brake lever is rotatable, with the result that one of the two brake cables is tensioned depending on the direction of rotation so that only one wheel brake is selectively operated in a subsequent operation of the hand brake lever.

* * * * *